United States Patent [19]
Nicol et al.

[11] Patent Number: 5,234,998
[45] Date of Patent: Aug. 10, 1993

[54] PROCEDURE FOR MANUFACTURING TRANSPARENT, IMPACT-RESISTANT STYRENE RESIN

[75] Inventors: Pascal Nicol, Pau; Laurence Orozco, Billere, both of France

[73] Assignee: Elf Atochem S.A., France

[21] Appl. No.: 693,948

[22] Filed: Apr. 29, 1991

[30] Foreign Application Priority Data

May 16, 1990 [FR] France .................. 90 06110

[51] Int. Cl.$^5$ ........................... C08F 297/04
[52] U.S. Cl. ..................... 525/314; 525/271; 525/250
[58] Field of Search ........... 525/314, 271, 250, 52, 525/98

[56] References Cited

U.S. PATENT DOCUMENTS

| | | | |
|---|---|---|---|
| 3,976,607 | 8/1976 | Hokama et al. | 525/98 |
| 4,530,967 | 7/1985 | Shiraki et al. | 525/314 |
| 4,539,136 | 9/1985 | Broekhuis | 525/314 |
| 4,952,627 | 8/1990 | Morita et al. | 525/52 |

*Primary Examiner*—James J. Seidleck
*Assistant Examiner*—Mark L. Warzel

[57] ABSTRACT

A process for manufacturing block copolymers comprising anionically polymerizing a vinyl aromatic hydrocarbon mononer in solution in an aromatic hydrocarbon solvent capable of giving a homogeneous medium until attaining a homogeneous medium with a viscosity greater than 300 Pa.s at 20° C. for a concentration of polymer in the aromatic hydrocarbon solvent between 60 and 90% by weight and then, after introduction of a conjugated diene, carrying out a copolymerization until a homogeneous medium is attained have a viscosity greater than 300 Pa.s at 90° C. for a concentration of copolymer in the aromatic hydrocarbon solvent between 70 and 90% by weight, without the viscosity exceeding 3,000 Pa.s in either of the two polymerization steps.

7 Claims, No Drawings

PROCEDURE FOR MANUFACTURING TRANSPARENT, IMPACT-RESISTANT STYRENE RESIN

BACKGROUND OF THE INVENTION

The present invention pertains to a procedure for manufacturing transparent, impact-resistant styrene resin, which procedure comprises anionically copolymerizing a conjugated diene and a vinyl aromatic hydrocarbon monomer in a concentrated homogeneous medium in an aromatic hydrocarbon solvent.

Anionic copolymerization for the manufacture of such products is known and described in numerous patents, one of the most typical of which is U.S. Pat. No. 3,639,517. According to this patent, the anionic copolymerization is carried out in multiple stages at pressures that are high enough to maintain the reaction medium in a highly liquid state. Although it is stated that the copolymerization may be carried out without solvent, it is impossible to carry out this anionic polymerization in dry phase on an industrial scale. In order to obtain a liquid medium suitable for anionic polymerization in dry phase, it is necessary to operate at temperatures higher than 180° C. which very quickly and irreversibly degrade the active sites. It is therefore necessary for this process to employ reactors with very short residence times on the order of several tenths of seconds. This type of system is too risky from an industrial point of view. It is clear from this patent that in practice anionic copolymerization of vinyl aromatic monomers and conjugated dienes must be carried out in a highly diluted medium. In addition to the drawback of handling a large amount of solvent which requires voluminous apparatus and additional operations for final elimination of the solvent, anionic copolymerization in a highy dilute medium induces a more extensive degradation of the active sites of the polymeric masses than in the case of copolymerization in a concentrated medium. Nevertheless, none of the described procedures has demonstrated the possibility of carrying out anionic copolymerization in a concentrated medium. The known maximum concentrations are on the order of 30% by weight of polymerizate in the solvent. In order to maintain a liquid, homogeneous reaction medium, this concentration cannot effectively be exceeded in most of the known solvents employed in this type of anionic polymerization. Higher concentrations lead to a hetrogeneous liquid medium which manifests itself by the presence of multiple phases. These multiple phases induce in the final copolymer a hetrogeneity of structure, e.g., of molecular weights and index of polydispersity, which makes it very difficult or even impossible to control the final properties of the resin.

SUMMARY OF THE INVENTION

The process in accordance with the present invention for manufacturing block copolymers comprises anionically copolymerizing in a solvent medium a vinyl aromatic hydrocarbon monomer in a first step and a conjugated diene in a second step. The procedure is characterized in that in the first step the vinyl aromatic hydrocarbon monomer is polymerized in an aromatic hydrocarbon solvent until attainment of a homogeneous medium with a viscosity higher than 300 Pa.s at 20° C. for a concentration of polymer in the aromatic hydrocarbon solvent between 60 and 90% by weight. The procedure is furthermore characterized in that in a second step, after introduction of the conjugated diene, copolymerization is carried out until attainment of a homogeneous medium with a viscosity higher than 300 Pa.s at 90° C. for a concentration of copolymer in the aromatic hydrocarbon solvent between 70 and 90% by weight. The viscosity must not exceed 3000 Pa.s in either of the two steps.

DETAILED DESCRIPTION

In order to obtain homogeneous viscous media, it is imperative to employ an aromatic hydrocarbon solvent capable of giving a homogenous medium; ethylbenzene or possible toluene as the reaction medium solvent.

The homogeneous viscous medium exists in both steps as a single phase free from any precipitation of matter. Viscosities lower than or equal to 500 Pa.s can be measured with a RHEOMAT 30 device of the COUETTE type operating in continuous flow. This device is equipped with a DC 50 measurement cell, so-called autoclave. This type of device conforms to the standard NF-T51-211. Viscosities greater than or equal to 500 Pa.s can be measured with a GOETTFERT capillary rheometer (RHEOGRAPH 2002) using a capillary with a diameter of 0.5 mm and a length of 30 mm, and with the pressure sensor being under 290 bars and the shear velocity from 10 to $1000 s^{-1}$. These viscosities are measured under an inert atmosphere.

In the first step the vinyl aromatic hydrocarbon monomer is put in solution in the aromatic solvent in the presence of the anionic polymerization initiator. The polymerization is carried out at a temperature between 20° and 100° C., preferably between 50° and 90° C., under pressures between 1 and 10 bar. Polymerization is continued until the medium corresponds to the previous conditions noted. The conjugated diene is added at this stage along with a possible addition of anionic polymerization initiator, and copolymerization is carried out at a temperature between 50° and 110° C., preferably between 80° and 100° C., under pressures between 1 and 10 bar. Copolymerization is continued until attainment of the claimed homogeneous medium. Because of the viscosity of the medium, it is important to implement agitation of the reactants in a manner than is well adapted to the creation of a homogeneous mixture. It is strongly recommended that the agitation completely sweep the walls of the polymerization reactor so as to avoid any deposit which, by not following the reaction kinetics of the medium, could induce hetrogeneities in the viscous polymer and copolymer formed at the end of either stage.

The anionic polymerization initiator is conventionally a lithium compound. This initiator is described specifically in U.S. Pat. No. 3,317,918. The most common example is a n-butyllithium.

At the end of the copolymerization of the conjugated diene, the anionic polymerization initiator is destroyed by means of a multifunctional compound that has at least two functions capable of reacting with the terminal functions of the copolymer. However, the multifunctional compound preferably has three reactive functions so as to form stellate branched copolymers. These multifunctional compounds are described in U.S. Pat. No. 3,281,383 and are, e.g. polyepoxides such as epoxidized linseed or soybean oil, or polyimines, polyisocyanates, polyaldehydes or polyhalides. The amount of multifunctional compound employed is generally sufficient to ensure the complete destruction of the lithium compound, which is itself employed in an amount of 0.1 to 1.5 parts per 100 parts of monomer and conjugated diene. In order to ensure good neutralization of the chain ends, it may possibly be useful to subject the mixture to a final treatment with a monofunctional chain-termination agent of the, e.g., monoalcohol, monoacid or water type.

In the second step for manufacturing functional multiblock copolymers, it is possible to combine with the conjugated diene a vinyl aromatic hydrocarbon monomer, preferably identical to the one employed in the first step.

In accordance with the invention, all of the solvent required for all of the copolymerization can be introduced into the reaction medium at the beginning of the first step. Nevertheless, it may be preferable to simultaneously add the solvent and the monomer and/or diene in each step such that the concentration of solvent in the reaction medium remains essentially constant.

The vinyl aromatic hydrocarbon monomers that can be used in the procedure contain from 8 to 18 carbon atoms per molecule. This monomer can be, e.g., styrene, 3-methylstyrene, 4-n-propylstyrene or 4-cyclohexylstyrene.

The conjugated dienes that can be used usually contain from 4 to 12 carbon atoms per molecule. This diene can be, e.g. 1,3-butadiene, isoprene or 2,3-dimethly-1,3-butadiene.

In the process, 15 to 40 parts of diene are generally copolymerized with, correspondingly, 80 to 65 parts of vinyl aromatic hydrocarbon monomer. This monomer may either be totally polymerized in the first step or partially polymerized in the first step and partially polymerized in mixture with the diene in the second step.

In order to finally recover the copolymer, after a possible addition of an antioxidant system, the homogeneous, viscous copolymer mass is treated at a temperature higher than the boiling point of the aromatic hydrocarbon solvent employed. Completely recommended conditions for elimination of the solvent are a treatment temperature lower than 250° C. under atmospheric pressure or under a maximum vacuum of 200 mbars. The copolymer recovered after this treatment may still contain traces of solvent which are eliminated in a conventional manner by degassing extrusion or by vapor treatment of the copolymer in granulated form.

The procedure of the invention is very simple because it can be carried out in a single reactor and a single flash degassing step is sufficient for eliminating almost all of the solvent; the final traces of solvent can be eliminated as described above. This simplification can be achieved with a percentage of solvent in the reaction medium lower than 50% by weight and, better yet, lower than 30%, before degassing.

The following examples illustrate the invention without, however, limiting it.

EXAMPLE 1

A 20-liter stainless steel reactor, equipped with temperature regulation and a double-band type agitator connected to a 0.55-kw motor, is purged with nitrogen and repeated washing with a solution of n.BuLi in ethylbenzene, after which 3000 g of dry ethylbenzene and 9.6 g of n.BuLi are charged.

250 g of styrene are introduced in less than 5 minutes at a temperature between 20° and 30° C. The temperature is raised to a value close to 50° C. This initiation period does not exceed 20 minutes after which are introduced in a continuous manner 5000 g of styrene over a period of less than 2 hours. The temperature is raised to circa 70° C. in less than 30 minutes. This temperature is maintained during the first polymerization stage of the styrene. When the viscosity of the medium measured at 20° C. reaches essentially 500 Pa.s, 1750 g of liquid butadiene are introduced. The temperature is raised to circa 90° C. and is maintained at this value during the polymerization of the butadiene. The pressure in the reactor is 7 bar. When the viscosity of the medium, measured at 90° C., reaches essentially 580 Pa.s, 38 g of epoxidized soybean oil (ESTABEX 2307 ®) are introduced into the reactor with the temperature still maintained at 90° C. for circa 30 minutes. The reaction mixture is deactivated with $CO_2$ under 3 bar and then with an amount of water calculated essentially in a stoichiometric manner in relation to the lithium.

The antioxidants are then introduced in a conventional manner, i.e., more specifically, 0.25% by weight of IRGANOX 1075 ® and 0.7% by weight of trinonylphenylphosphite (STAVINOR ®).

The copolymer is then degassed in a single flash stage in a conventional system constituted of a tubular preheater mounted in a devolatilization chamber. This operation is carried out at 200° C. at a pressure of 700 mbar and allows generation of granules of a transparent resin with a residual solvent content between 1 and 2%. This residual solvent can be eliminated by degassing either by extrusion under vacuum or by oven drying of the granules under vacuum, circa 100° C. under 15 mbar, or by extraction (stripping) with water over the granules. The final residual solvent content is lower than 300 ppm.

The molecular weights determined from the gel-permeation chromatography (GPC) curves for the products of each of the steps are presented in the following table:

|     | Mw      | Mn     | I   |
| --- | ------- | ------ | --- |
| PS  | 42,000  | 35,000 | 1.2 |
| SB  | 60,000  | 46,000 | 1.3 |
| SB* | 122,000 | 72,000 | 1.7 |

Mw = Mean molecular weight by weight
Mn = Mean molecular weight by number
$I = \frac{Mw}{Mn}$
PS = Polystyrene from the first step
SB = Copolymer from second step
SB* = Copolymer after treatment with epoxidized soybean oil

EXAMPLE 2

Comparative

The preceding example is repeated in its entirety with the exception that ethylbenzene is replaced by cyclohexane.

The viscosity of the medium before addition of the butadiene is 255 Pa.s at 70° C. yielding a mixture viscosity of 17 Pa.s at 70° C. and a viscosity of 500 Pa.s at 20° C.

The viscosity of the medium corresponding to that of the second step of Example 1 is 8,300 Pa.s at 90° C.

The GPC curves show that the products obtained from anionic polymerization in cyclohexane medium have irregular distributions of the molecular weight and are not coupled.

The results obtained are presented in the following table:

|     | Mw      | Mn     | I    |
| --- | ------- | ------ | ---- |
| PS  | 70,000  | 28,000 | 2.5  |
| SB  | 106,000 | 35,000 | 3.02 |
| SB* | 130,000 | 34,000 | 3.8  |

EXAMPLE 3

Under the conditions of Example 1, initiation of polymerization of the styrene is carried out in the presence of 2.4 g of n.BuLi rather than 9.6 g. After the initiation period, 3250 g of styrene are introduced. Polymerization is achieved in 1 hour 24 minutes at 70° C. 7.2 g of n.BuLi and 1750 g of styrene are added at this stage. Polymerization is continued for 40 minutes at 70° C.

The remainer of the procedure is continued in accordance with Example 1.

The viscosity of the medium at the end of polymerization of the styrene is 415 Pa.s measured at 20° C. The viscosity of the medium at the end of polymerization of the butadiene is 304 Pa.s measured at 90° C.

The results obtained are presented in the following table:

|     | Mw      | Mn     | I   |
| --- | ------- | ------ | --- |
| PS  | 79,000  | 32,000 | 2.5 |
| SB  | 91,000  | 54,000 | 1.7 |
| SB* | 150,000 | 77,000 | 1.9 |

The ratio I of 2.5 for the material obtained at the end of polymerization of the styrene reveals the presence of a double distribution of the polystyrene with two peaks; the index of polymolecularity taken individually at each peak is less than 1.3 which is in complete conformity with polymerization existing under the conditions of the Example.

While the invention has been described in connection with a preferred embodiment, it is not intended to limit the scope of the invention to the particular form set forth, but on the contrary, it is intended to cover such alternatives, modifications, and equivalents as may be included with the scope and spirit of the invention as defined by the appended claims.

What is claimed is:

1. A process for manufacturing block copolymers comprising anionically polymerizing a vinyl aromatic hydrocarbon monomer in solution in ethylbenzene solvent capable of giving a homogeneous medium until attaining a homogeneous medium with a viscosity greater than 300 Pa.s at 20° C. for a concentration of polymer in the aromatic hydrocarbon solvent between 50 and 90% by weight and then, after introduction of a conjugated diene carrying out a copolymerization until a homogeneous medium is attained having a viscosity greater than 300 Pa.s at 90° C. for a concentration of copolymer in the aromatic hydrocarbon solvent between 70 and 90% by weight, without the viscosity exceeding 3,000 Pa.s in either of the two polymerization steps.

2. The process of claim 1, wherein the solvent and the monomer and/or the diene are added simultaneously in each respective polymerization step so as to maintain the concentration of solvent in the reaction medium at an essentially constant level.

3. The process of claim 2, wherein the two polymerization steps are carried out in a single reactor.

4. The process of claim 3, wherein the percentage by weight of solvent in the reaction medium, at the end of the two polymerization stages before degassing, is lower than 50%.

5. The process of claim 1 wherein the aromatic hydrocarbon solvent is ethyl benzene and the monomer used in the first step, the solvent and the diene are added simultaneously so as to maintain the concentration of solvent in the reaction medium at an essentially constant level.

6. The process of claim 5, wherein the two polymerization steps are carried out in a single reactor.

7. The process of claim 6, wherein the percentage by weight of solvent in the reaction medium, at the end of the two polymerization stages before degassing, is lower than 50%.

* * * * *

UNITED STATES PATENT AND TRADEMARK OFFICE
CERTIFICATE OF CORRECTION

PATENT NO. : 5,234,998
DATED      : August 10, 1993
INVENTOR(S) : Nicol, Pascal

It is certified that error appears in the above-indentified patent and that said Letters Patent is hereby corrected as shown below:

Col. 3, line 54, after "30%," insert --of the total weight--

Signed and Sealed this

Twenty-second Day of March, 1994

Attest:

BRUCE LEHMAN

Attesting Officer   Commissioner of Patents and Trademarks